United States Patent Office 3,367,928
Patented Feb. 6, 1968

3,367,928
UNSYMMETRICAL BIS-(ANTHRAQUINONE-AZOLE) - AZOBIPHENYL YELLOW VAT DYES
Walter R. Demler, Hamburg, N.Y., assignor to Allied Chemical Corporation, New York, N.Y., a corporation of New York
No Drawing. Filed Feb. 2, 1965, Ser. No. 429,907
8 Claims. (Cl. 260—157)

ABSTRACT OF THE DISCLOSURE

Unsymmetrical bis-(anthraquinone-azole)-azo biphenyl compounds of the formula

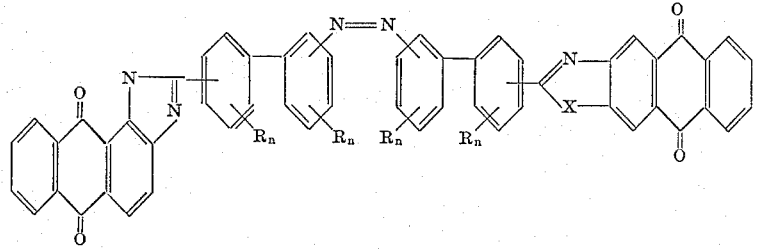

wherein X is O or S, R is H or lower alkyl, n is whole number from 1 to 3 and the anthraquinone nuclei A and B may each be further substituted by 1 to 3 chloro, bromo, loweralkyl, lower alkoxy, perchloro, or perbromo, lower alkyl, lower alkylol amino aryl and aroylamino of no more than 6 ring carbon atoms substituents which give strong yellow dyeings on vegetal fibers from the vat and which dyeings have good fastness properties to light, to washing and to bleaching treatments and have excellent stability to high temperatures.

This invention relates to vat dyestuffs of the anthraquinone series which dye vegetal fibers yellow shades. It relates more particularly to novel vat dyestuffs of that class of bis-(anthraquinone-azole)-azobiphenyl compounds in which two anthraquinone-azole radicals are linked, respectively, through the carbon atoms of the azole radicals to carbon atoms of an azobiphenyl nucleus.

Anthraquinone-azole compounds of said class are disclosed in U.S. Patent 2,175,803. They are usually prepared by condensing azobiphenyl-dicarbonyl chloride with an aminoanthraquinone having, adjacent to the amino group, a halogen atom or a hydroxyl, mercapto or amino group; and subjecting the resulting intermediate product to ring-closure and conversion to the corresponding symmetrical bis-(anthraquinone-imidazole, -oxazole or -thiazole)-azobiphenyl compound. The known imidazole compounds of said class, and especially those which produce yellow shades on vegetal fibers, are subject to one or more deficiencies, however, which have limited their usefulness as vat dyes; for example, poor tinctorial strength, and poor fastness properties (to light or to washing or to bleaching treatments). Moreover, certain of them are deficient in application properties; they are unstable when dyed at high temperatures being of relatively poor stability in the alkaline hydrosulfite vat.

The primary object of the present invention is to provide new compounds of the bis-(anthraquinone-azole)-azobiphenyl class which give strong yellow dyeings on vegetal fibers from the vat, having good fastness properties (to light, to washing and to bleaching treatments) and which have excellent stability to high temperatures.

Another object of the present invention is to provide new bis-(anthraquinone-azole)-azobiphenyl compounds which possess relatively good stability in the alkaline hydrosulfite vat.

A further object of the present invention is to provide a process for preparing such bis-(anthraquinone-azole)-azobiphenyl compounds.

Other objects of the invention in part will be obvious and in part will appear hereinafter.

According to the present invention the above objects are accomplished by the provision of compounds of the above class which are unsymmetrical bis-(anthraquinone-azole)-azobiphenyl compounds in which (1) a 6,11-dioxo-1H-anthra[1,2-d]imidazolyl radical is linked through the 2-carbon atom of the imidazolyl radical to one of the biphenyl radicals of an azobiphenyl nucleus and (2) a 5,10-dioxo-anthra[2,3-d]oxazolyl or thiazolyl radical (that is, a radical in which the heterocyclic nucleus contains an element in addition to nitrogen which is one of the first two members of Group VI of the Periodic Table) is linked through the 2-carbon atom to the other biphenyl radical of the azobiphenyl nucleus.

Preferred compounds of the present invention are the unsymmetrical bis-(anthraquinone-azole)-azobiphenyl compounds of said type in which the antraquinone-azole radicals are respectively linked through their 2-carbon atoms to the 4- and 4'-positions of the respective biphenyl radicals of the azobiphenyl nucleus, and especially those in which oxygen forms a part of the second azole radical.

I have discovered that the unsymmetrical bis-(anthraquinone-azole)-azobiphenyl compounds of the present invention, and especially those of the latter type, are vat dyestuffs which dye vegetal fibers yellow colorations (i.e., yellow to reddish-yellow or orange) which have high tinctorial strength, which are fast to light, to washing and to bleaching treatments, and which in the reduced state have excellent stability to high temperatures.

This result is surprising because the symmetrical bis-(anthra-imidazolyl)-azobiphenyls suffer from inadequate tinctorial strength and fastness properties and instability at high temperatures.

The unsymmetrical bis-(anthraquinone-azole)-azo-biphenyl compounds of the present invention are represented by the following Formula I:

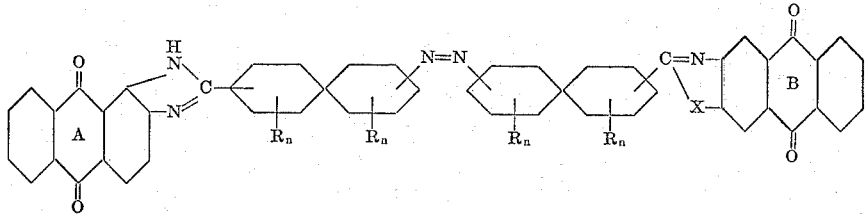

I wherein

X is selected from the group consisting of O and S,
R is selected from the group consisting of hydrogen, halogen and lower alkyl and lower alkoxy radicals, and
n is a whole number from 1 to 3, and the anthraquinone nuclei A and B may each be further substituted by 1 to 3 substituents selected from the group consisting of halogen and lower alkyl, perhalo lower alkyl, lower alkoxy, alkylolamine, aryl and aroylamino radicals.

The term "lower," as employed herein (including the claims) in connection with alkyl and related radicals, denotes radicals having 1 to 6 carbon atoms.

Preferred compounds of the present invention, in which the anthraquinone-azole radicals are linked respectively through their 2-carbon atoms to the terminal para-positions of the respective biphenyl radicals of the azobiphenyl nucleus (herein termed the 4,4'-positions of the azobiphenyl radical), are represented by the following Formulas II and III, wherein R and n have the above meaning and the anthraquinone nuclei A and B may each be further substituted as set out above:

can be heated with a substantially equimolecular proportion of a 2-aminoanthraquinone having the following Formula V

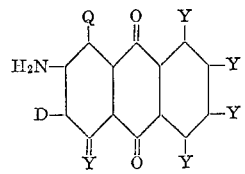

V wherein

D represents a member selected from the group consisting of chlorine, bromine, hydroxy and thiol,
Q represents a member selected from the group consisting of hydrogen and lower alkyl and lower alkoxy radicals; and
Y represents a member selected from the group consisting of hydrogen, halogen and lower alkyl, perhalo lower alkyl, lower alkoxy, alkylolamino, aryl, and aroylamino radicals.

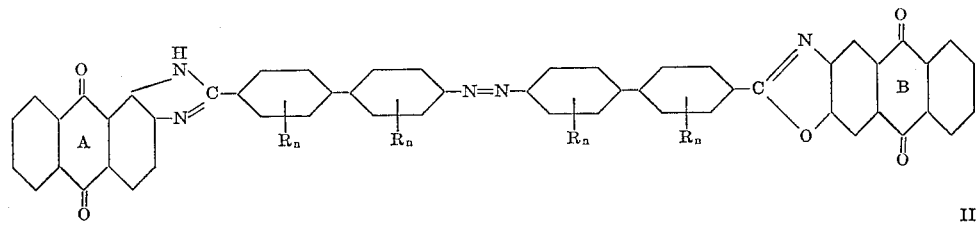

II

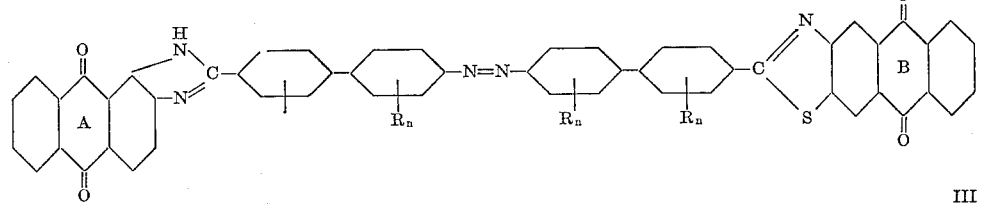

III

The compounds of the present invention can be synthesized in several ways.

Thus, they can be obtained by condensing a (6,11-dioxo-1H-anthra[1,2-d]imidazol-2-yl)azobiphenyl carbonyl halide (preferably the chloride or bromide) with a beta-aminoanthraquinone having a halogen, hydroxyl or mercapto substituent in the adjacent beta position; and simultaneously or subsequently converting the resulting N-2-anthraquinonyl-(6,11-dioxo-1H-anthra[1,2-d]imidazol-2-yl)azobiphenylcarboxamide to the oxazole or thiazole.

For example, a (6,11-dioxo-1H-anthra[1,2-d]imidazol-2-yl)azobiphenyl-carbonyl chloride having the following Formula IV and the resulting N-2-anthraquinonyl-(6,11-dioxo-1H-anthra[1,2-d]imidazol-2-yl)azobiphenylcarboxamide is converted to the oxazole or thiazole; for example, by heating it with acid binding and cyclizing or condensing agents (and a sulfide for the production of a thiazole when D represents chlorine or bromine).

The (6,11-dioxo-1H-anthra[1,2-d]imidazol-2-yl)azobiphenyl-carbonyl halide can itself be obtained by condensing an azobiphenyl-dicarbonyl halide with a 1,2-diamino-anthraquinone, and simultaneously or subsequently ring closing the resulting N-(amino-anthraquinonyl)carbamoyl-azobiphenyl-carbonyl halide, obtained as condensation product, to the imidazole.

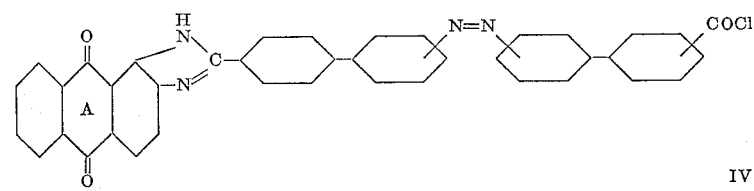

IV wherein R and n have the above meaning, and the anthraquinone nucleus A may be substituted as indicated above, Ring-closure of the latter condensation product to the imidazole can be carried out prior to the condensation of the resulting intermediate imidazolyl azobiphenyl-carbonyl chloride with the 2-aminoanthraquinone represented by Formula V; or it can be carried out in conjunction with formation of said imidazolyl azobiphenyl compound. Similarly, the condensation product resulting from the reaction of imidazolyl azobiphenyl-carbonyl chloride with the 2-amino-anthraquinone having a halogen, hydroxyl or mercapto (thiol) substituent in the 3-position can be converted to the oxazole or thiazole by ring-closure during the latter condensation, or subsequently thereto, or simultaneously with the ring-closure reaction forming the imidazole.

Accordingly, in carrying out the preparation of the unsymmetrical bis-(anthraquinone-azole)-azobiphenyl compounds of the present invention in accordance with the preferred procedure, an azobiphenyl-dicarbonyl chloride, represented by the following Formula VI:

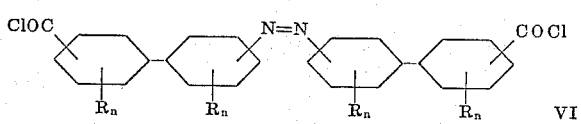

wherein R and n have the above meaning, is condensed, first with a substantially equimolecular quantity of a 1,2-diaminoanthraquinone having the following Formula VII:

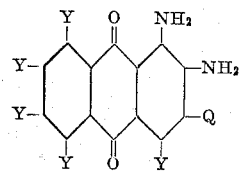

wherein Q and Y have the above meaning, followed by condensing the resulting aminoanthraquinonylamino-azobiphenyl-carbonyl chloride with a substantially equimolecular proportion of a 2-aminoanthraquinone having the above Formula V, and forming the respective imidazole and oxazole or thiazole rings simultaneously or step-wise.

In general the condensation is carried out by heating the above reactants in an inert organic medium which is liquid at the reaction temperature, such as, nitrobenzenes, nitrotoluenes, mono-, -di and -tri chlorobenzenes, and preferably with the aid of an organic acid binding agent; for example, an organic base such as pyridine, quinoline, collidine, dimethylaniline, and the like, or a salt such as sodium and potassium carbonates, sodium and potassium acetates, and the like.

The condensation reaction(s) can be carried out over a broad range of temperatures. Thus temperatures between 100° and 200° C. can be used although it is preferred to use a temperature within the range of about 120° to about 150° C. for this reaction. Temperatures above 200° C. are not advisable since they lead to increased amounts of by-products; while at temperatures below 100° C., the rate of reaction becomes inordinately slow.

Ring closure of the amines is effected by heating the condensation product(s) at a more elevated temperature (i.e., above 150° C., preferably between 160° and 220° C.), and preferably in the presence of catalysts (such as, copper salts) and acid binding agents (such as, sodium carbonate or potassium acetate).

The ring closures forming the respective heterocyclic nuclei can be carried out separately or at the same time; and, if desired, the condensation and ring closure reactions can both be effected by heating the reactants at a temperature within the range from about 160° C. to about 225° C.

The following compounds are representative of dyestuffs of the invention:

4 - (6,11 - dioxo-1H-anthra[1,2-d]imidazol-2-yl)-4'(5,10-dioxo-anthra[2,3-d]oxazol-2-yl)azobiphenyl 4 - (6,11 - dioxo-1H-anthra[1,2-d]imidazol-2-yl)4'-(5,10-dioxo-anthra[2,3-d]thiazol-2-yl)azobiphenyl 4 - (8 - chloro-6,11-dioxo-1H-anthra[1,2-d]imidazol-2-yl) - 4'-(5,10-dioxo-anthra[2,3-d]oxazol-2-yl)azobiphenyl 4 - (6,11 - dioxo - 1H-anthra[1,2-d]imidazol-2-yl)-4'-(6 - butoxy - 5,10 - dioxo-anthra[2,3-d]oxazol-2-yl)azobiphenyl 4 - (6,11 - dioxo-1H-anthra[1,2-d]imidazol-2-yl)-4'-5,10 - dioxo - anthra[2,3 - d]thiazol - 2 - yl)3,3'-dimethyl-azobiphenyl The following amino-anthraquinones exemplify the broad classes of 1,2-diamino-anthraquinones, represented by above Formula VII, and 2-amino-3-substituted-anthraquinones represented by above Formula V, which are suitable for producing the compounds of the present invention by the processes of this invention:

1,2-diaminoanthraquinone
1,2-diamino-3-bromoanthraquinone
1,2-diamino-4-chloroanthraquinone
1,2-diamino-5-bromoanthraquinone
1,2-diamino-6-chloroanthraquinone
1,2-diamino-5,8-dichloroanthraquinone
1,2-diamino-5-methylanthraquinone
1,2-diamino-8-ethoxyanthraquinone
1,2-diamino-5-benzamidoanthraquinone
2-amino-3-chloroanthraquinone
2-amino-3-chloro-1-methylanthraquinone
2-amino-3-mercaptoanthraquinone
2-amino-3-mercapto-8-ethoxyanthraquinone
2-amino-3-bromo-5-ethylanthraquinone
2-amino-3-bromo-4-methoxyanthraquinone
2-amino-3-mercapto-1-benzamidoanthraquinone The products obtained by the above processes of the invention can be conditioned for use in dyeing or printing in the known manner, for example, by acid pasting, salt grinding, sand grinding and the like. If desired, the crude products also may be subjected to oxidation and other purification treatments; for example, with sodium dichromate, aqueous alkali metal hydrochlorite, and the like, as is customary in the manufacture of vat dyestuffs.

The following examples describe specific embodiments of the invention and illustrate the best method contemplated for carrying it out; but they are not to be interpreted as limiting the invention to all details thereof, since changes can be made without departing from the scope of the invention. The temperatures are in degrees centigrade and the parts and percentages are by weight, unless designated as parts by volume. Where parts are by volume, the amount signifies the volume occupied by the same number of parts by weight of water at 4° C.

EXAMPLE 1

Part 1.—A mixture of 11.5 parts of azobiphenyl-4,4'-dicarbonyl chloride, 6.0 parts of 1,2-diaminoanthraquinone, 0.2 part of pyridine and about 420 parts of dry nitrobenzene is agitated and heated to 135° and held for about 3 hours at 135° to 140°. Then 7.0 parts of 2-amino-3-chloro-anthraquinone are added, and the mixture is heated to and maintained at 135° to 140° for about 18 hours to complete formation of the intermediate unsymmetrical bis - (aminoanthraquinonyl - carbamoyl)-azobiphenyl compound. Then, to convert it to the corresponding unsymmetrical product without isolation from the reaction mass, 12 parts of anhydrous potassium acetate, 12 parts of sodium carbonate, 0.2 part of cupric acetate and 0.2 part of cuprous chloride are added to the mass, which then is heated to boiling and refluxed (205° to 210°) for about 12 hours. The resultant mixture is cooled to about 80°, the slurry of product is filtered, and the filter cake is washed with nitrobenzene and then with alcohol. The washed cake is dried.

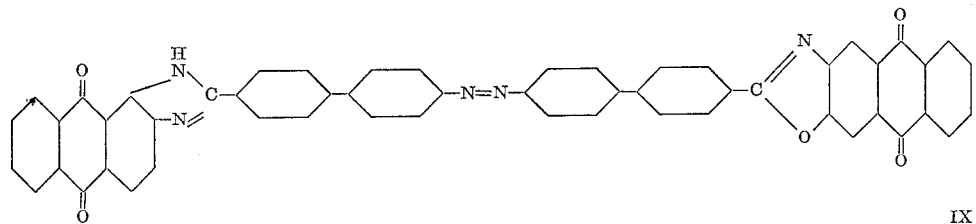

IX

*Part 2.*—For purposes of conditioning and purifying the resulting crude 4-(6,11-dioxo-anthra[1,2-d]imidazol-2 - yl) - 4' - (5,10-dioxo-anthra[2,3-d]oxazol-2-yl)azobiphenyl, 1 part thereof is dissolved in about 13 parts of 98% sulfuric acid with agitation at 15° to 20° for 2 to 3 hours; the resultant solution is drowned in about 130 parts of cold water; 1 part of sodium bichromate ($Na_2Cr_2C_7 \cdot 2H_2O$) is added; and the slurry is heated to 95° to 100°, held at said temperature for about 16 hours, cooled to below 80°, and filtered. The filter cake is washed acid-free with water; the washed cake is reslurried in about 130 parts of water containing 1 part of sodium carbonate and, after heating to 75° to 80°, about 2 parts of aqueous sodium hypochlorite (containing about 10% active chlorine) are added and the mixture is agitated at 75° to 80° for about 6 hours. The excess hypochlorite is destroyed by the addition of sodium bisulfite, the slurry is filtered, and the filter cake is washed alkali-free with water.

*Part 3.*—The washed filter cake obtained in accordance with Part 2 of this example is converted to a dyestuff paste by stirring it with 1% of a sulfonated naphthaleneformaldehyde condensation product ("Tamol N"). When cotton is dyed with the resulting dyestuff paste in an alkaline hydrosulfite vat in the usual manner, bright yellow dyeings are obtained having high tinctorial strength and excellent fastness to light and to washing. The vat is stable to heating at high temperatures. The resulting product corresponds to the formula

EXAMPLE 2

The process of Example 1 is repeated using 6.9 parts of 1,2-diamino-6-chloroanthraquinone in place of the 1,2-diaminoanthraquinone. The resulting dyestuff corresponds to the formula

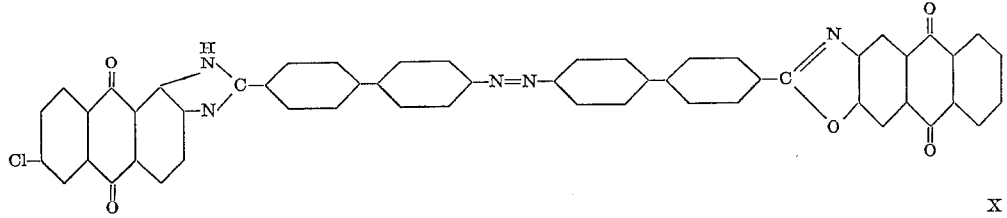

X

Its dyeings on cotton are slightly greener than those obtained with the dyestuff of Example 1. The fastness characteristics are equal to those obtained with said dyestuff.

EXAMPLE 3

Repetition of the procedure of Example 1 but using 7.0 parts of 2-amino-3-mercaptoanthraquinone instead of the 2-amino-3-chloroanthraquinone, gives the corresponding unsymmetrical product corresponding to the formula

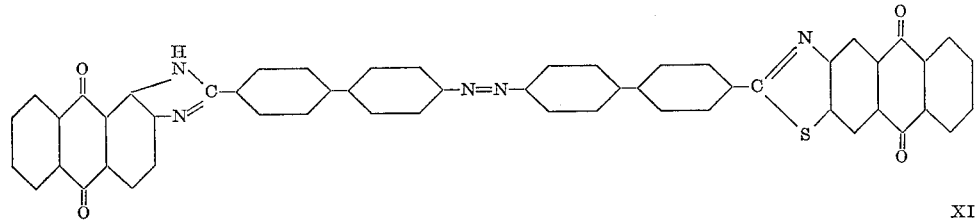

XI

Its dyeings on cotton have comparable fastness qualities but are distinctly redder in shade than the dyeings obtained with the dyestuff of Example 1.

It will be realized by those skilled in the art that the invention is not limited to the details of the foregoing description and that changes can be made without departing from the scope of the invention.

Thus instead of the amino-anthraquinones and azobiphenyl-dicarbonyl chloride employed in the above specific examples, molecularly equivalent amounts of others of the specific anthraquinones and azobiphenyl-dicarbonyl halides disclosed above may be substituted in practicing the processes of the above specific examples. Further, the specific proportions, temperatures and reagents employed in the specific examples can be varied, as indicated in the above disclosure.

I claim:
1. Unsymmetrical bis - (anthraquinone - azole)-azobiphenyl compounds represented by the formula:

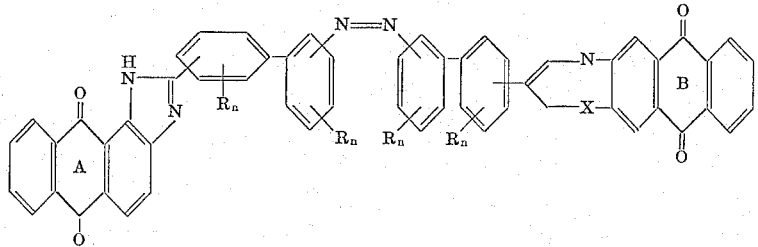

wherein
X is selected from the group consisting of O and S,
R is selected from the group consisting of hydrogen and lower alkyl radicals,
n is a whole number from 1 to 3, and the anthraquinone nuclei A and B each may be further substituted by 1 to 3 substituents selected from the group consisting of chlorine, bromine, lower alkyl, perchloro and perbromo lower alkyl, lower alkoxy, lower alkyloamino, aryl and aroylamino of no more than 6 ring carbon atoms.

2. An unsymmetrical bis - (anthraquinone-azole)-azobiphenyl compound as defined in claim 1 wherein X is oxygen, R is hydrogen, and the anthraquinone nuclei A and B may be further substituted by one to three substituents selected from the group consisting of chlorine, bromine, lower alkyl, and lower alkoxy.

3. An unsymmetrical bis - (anthraquinone-azole)-azobiphenyl compound as defined in claim 1 wherein X is sulfur, R is hydrogen, and the anthraquinone nuclei A and B may be further substituted by one to three substituents selected from the group consisting of chlorine, bromine, lower alkyl and lower alkoxy.

4. The compound 4 - (6,11 - dioxo-1H-anthra[1,2-d]imidazol - 2-yl)-4'-(5,10-dioxoanthra[2,3-d]oxazol-2-yl) azobiphenyl.

5. The compound 4 - (6,11 - dioxo-1H-anthra[1,2-d]imidazol - 2-yl)-4'-(5,10-dioxoanthra[2,3-d]thiazol-2-yl) azobiphenyl.

6. The compound 4 - (8 - chloro-6,11-dioxo-1H-anthra[1,2-d]imidazol - 2 - yl) - 4'-(5,10-dioxo-anthra[2,3-d]oxazol-2-yl)azobiphenyl.

7. The compound 4 - (6,11 - dioxo-1H-anthra[1,2-d]imidazol - 2 - yl)-4'-(6-butoxy-5,10-dioxo-anthra[2,3-d]oxazol-2-yl)azobiphenyl.

8. The compound 4 - (6,11 - dioxo-1H-anthra[1,2-d]imidazol - 2 - yl)-4'-(5,10-dioxoanthra[3,3-d]thiazol-2-yl)-3,3'-dimethyl-azobiphenyl.

References Cited
UNITED STATES PATENTS 2,559,673    7/1951    Schroeder et al. _____ 260—157
2,601,100    6/1952    Deinet _____ 260—157
2,719,840    10/1955   Deinet _____ 260—157

FLOYD D. HIGEL, *Primary Examiner.*

UNITED STATES PATENT OFFICE
CERTIFICATE OF CORRECTION

Patent No. 3,367,928                  February 6, 1968

Walter R. Demler

It is hereby certified that error appears in the above numbered patent requiring correction and that the said Letters Patent should read as corrected below.

Column 2, line 44, for "antraquinone" read -- anthraquinone --; columns 3 and 4, the left-hand portion of the formula III should appear as shown below instead of as in the patent:

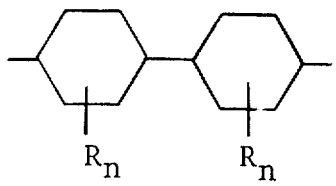

column 4, lines 5 to 10, the formula should appear as shown below instead of as in the patent:

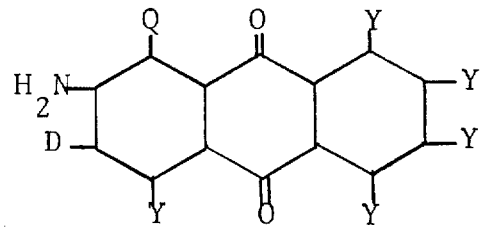

column 6, line 14, for "5,10-" read -- (5,10- --; columns 7 and 8, the left-hand portion of formula X, should appear as shown below instead of as in the patent:

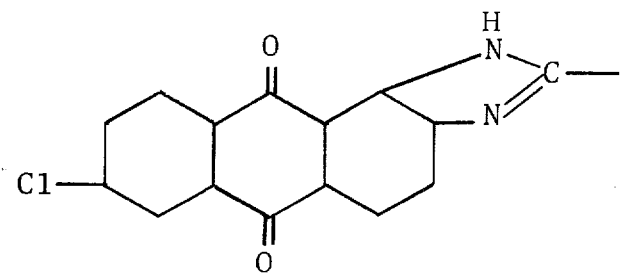

columns 9 and 10, claim 1, the formula should appear as shown below instead of as in the patent:

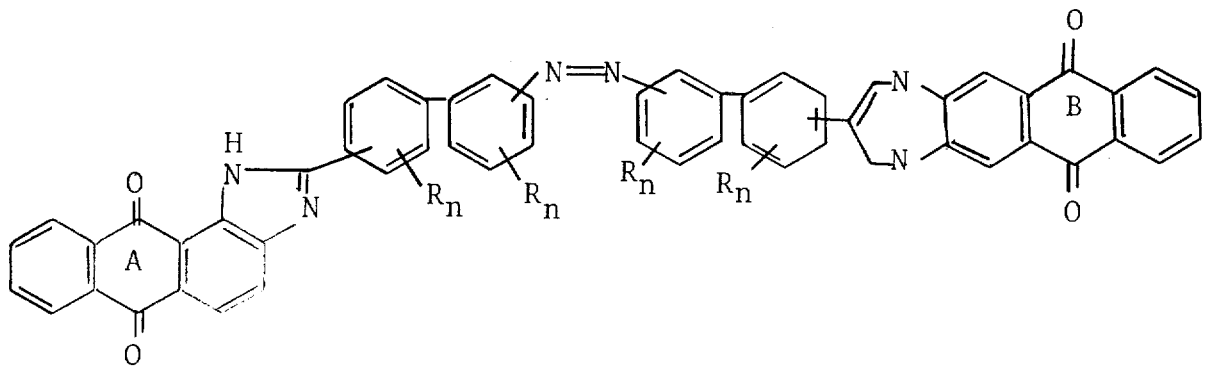

Signed and sealed this 22nd day of July 1969.

(SEAL)
Attest:

EDWARD M. FLETCHER, JR.
Attesting Officer

WILLIAM E. SCHUYLER,
Commissioner of Patent